(12) United States Patent
Ertle et al.

(10) Patent No.: US 11,390,259 B2
(45) Date of Patent: Jul. 19, 2022

(54) SOLENOID VALVE FOR CONTROLLING THE BRAKE PRESSURE OF A WHEEL BRAKE

(71) Applicant: Robert Bosch GmbH, Stuttgart (DE)

(72) Inventors: Marcus Ertle, Immenstadt (DE); Stephan Steingass, Suzhou (CN); Carsten Bodmann, Ludwigsburg (DE); Hans-Peter Bartosch, Oberstdorf (DE); Stephan Knackert, Haldenwang (DE); Philipp Mueller, Lauben-Heising (DE)

(73) Assignee: Robert Bosch GmbH, Stuttgart (DE)

( * ) Notice: Subject to any disclaimer, the term of this patent is extended or adjusted under 35 U.S.C. 154(b) by 261 days.

(21) Appl. No.: 16/340,960

(22) PCT Filed: Sep. 20, 2017

(86) PCT No.: PCT/EP2017/073830
§ 371 (c)(1),
(2) Date: Apr. 10, 2019

(87) PCT Pub. No.: WO2018/072959
PCT Pub. Date: Apr. 26, 2018

(65) Prior Publication Data
US 2019/0232936 A1    Aug. 1, 2019

(30) Foreign Application Priority Data
Oct. 18, 2016    (DE) .................... 10 2016 220 335.5

(51) Int. Cl.
*B60T 13/68*    (2006.01)
*B60T 8/36*    (2006.01)
(Continued)

(52) U.S. Cl.
CPC ............ *B60T 13/686* (2013.01); *B60T 8/341* (2013.01); *B60T 8/363* (2013.01); *B60T 15/028* (2013.01);
(Continued)

(58) Field of Classification Search
CPC ........ B60T 8/341; B60T 8/363; B60T 13/686; B60T 15/028; B60T 2270/10; F16K 31/0651; G05D 16/2022
See application file for complete search history.

(56) References Cited

U.S. PATENT DOCUMENTS 6,644,623 B1 * 11/2003 Voss ........................ B60T 8/363
                                                                251/129.01
8,998,167 B2 *  4/2015 Leidig ................... F16K 15/185
                                                                251/83

FOREIGN PATENT DOCUMENTS

CN       105793629 A      7/2016
DE       196 11 832 A1   10/1997
(Continued)

OTHER PUBLICATIONS

International Search Report corresponding to PCT Application No. PCT/EP2017/073830, dated Feb. 9, 2018 (German and English language document) (7 pages).

*Primary Examiner* — Eric Keasel
(74) *Attorney, Agent, or Firm* — Magmet, Moore & Beck LLP (57) ABSTRACT

A solenoid valve, for controlling a brake pressure of a wheel brake of a slip-regulatable hydraulic brake system for a motor vehicle, includes a valve element, valve insert, valve seat, spring device, electromagnetic actuator, and armature. The valve element is longitudinally movably positioned at least partially in the valve insert, positioned between the armature and the valve seat, and configured to interact with the valve seat. The spring device, in an assembled position,
(Continued)

has a force component acting on the valve element in an opening direction with respect to the valve seat. The electromagnetic actuator is configured to act on the valve element in a closing direction with respect to the valve seat. The valve element has a contact surface operatively connecting the valve element and armature, and configured such that a central axis of the valve element and the contact surface form a non-rectangular intersection angle.

11 Claims, 6 Drawing Sheets

(51) Int. Cl.
*G05D 16/20* (2006.01)
*B60T 8/34* (2006.01)
*B60T 15/02* (2006.01)
*F16K 31/06* (2006.01)

(52) U.S. Cl.
CPC ..... *F16K 31/0651* (2013.01); *G05D 16/2022* (2019.01); *B60T 2270/10* (2013.01)

(56) References Cited

FOREIGN PATENT DOCUMENTS

| | | |
|---|---|---|
| DE | 10 2004 030 428 A1 | 1/2006 |
| DE | 10 2006 003 857 A1 | 8/2007 |
| DE | 10 2007 053 134 A1 | 5/2009 |
| EP | 1 108 515 A1 | 6/2001 |
| JP | H10-38123 A | 2/1998 |
| JP | 2013210049 A | 10/2013 |
| WO | 01/36242 A1 | 5/2001 |
| WO | 2015/001789 A1 | 8/2015 |

\* cited by examiner

SOLENOID VALVE FOR CONTROLLING THE BRAKE PRESSURE OF A WHEEL BRAKE

This application is a 35 U.S.C. § 371 National Stage Application of PCT/EP2017/073830, filed on Sep. 20, 2017, which claims the benefit of priority to Serial No. DE 10 2016 220 335.5, filed on Oct. 18, 2016 in Germany, the disclosures of which are incorporated herein by reference in their entirety.

The present disclosure relates to a solenoid valve for controlling the brake pressure of a wheel brake of a slip-controllable hydraulic brake system of a motor vehicle, having a valve element, which is arranged at least partly in a valve insert in a longitudinally movable manner and interacts with a valve seat and which, in the installed position, is acted upon by a spring device with a force component acting in the opening direction with respect to the valve seat and can be actuated in the closing direction with respect to the valve seat by means of an electromagnetic actuator, wherein the valve element is arranged between an armature and the valve seat, and a contact surface, at which the valve element is operatively connected to the armature, is formed on the valve element, characterized in that the contact surface is designed in such a way that a non-right-angled intersection angle is formed between a central axis of the valve element and the contact surface.

BACKGROUND

Figure 1:
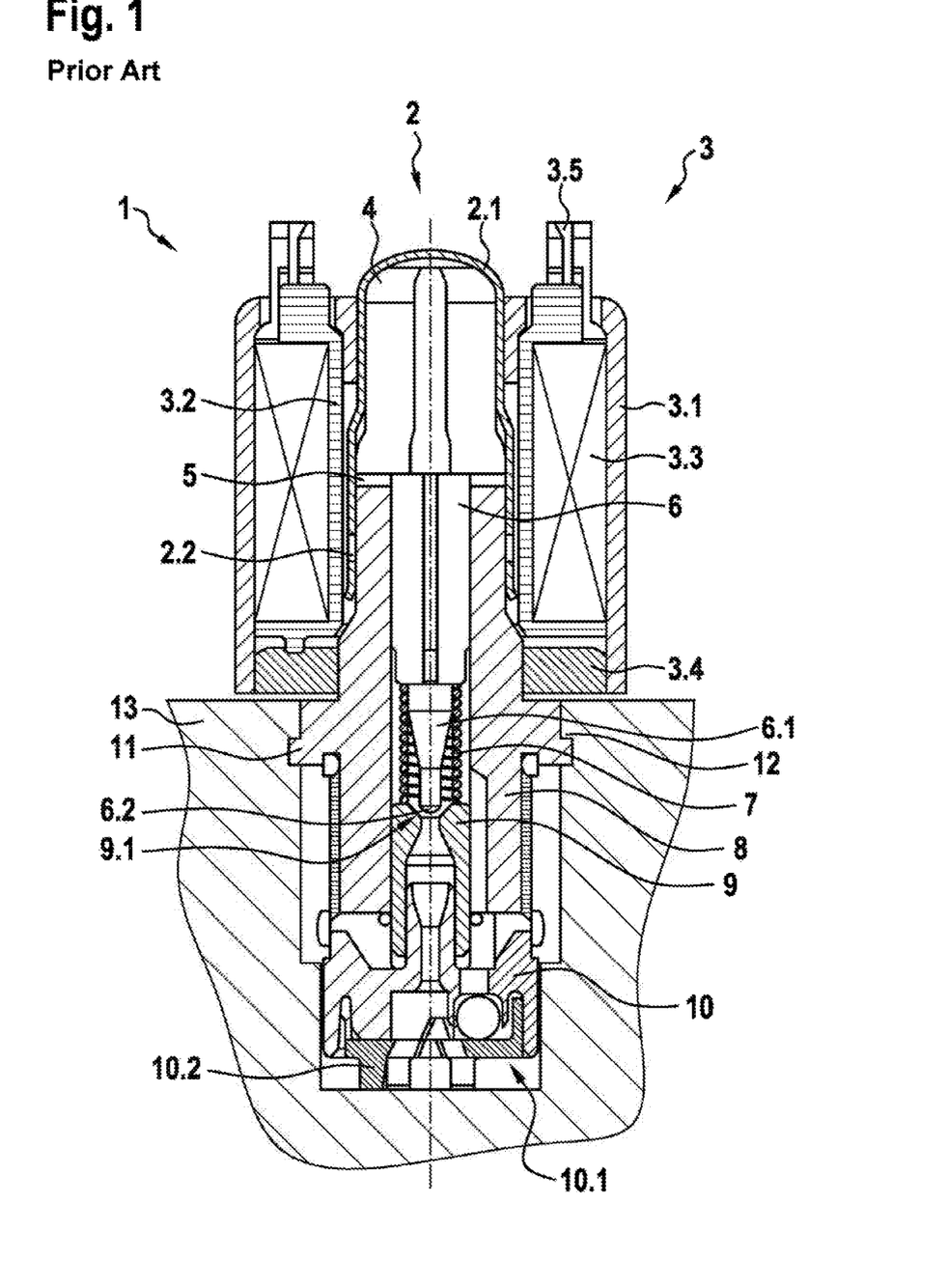
FIG. 1 shows a schematic sectional view of a conventional solenoid valve.

The prior art includes Patent Application DE 10 2007 053 134 A1, for example. This document relates to a solenoid valve, in particular a solenoid valve for a hydraulic unit, which is used in an antilock brake system (ABS) or traction control system (ASR system) or an electronic stability program system (ESP system), for example. One such system is illustrated in FIG. 1. As can be seen from FIG. 1, the solenoid valve 1, which is embodied as a normally open control valve for example, comprises a magnet subassembly 3 for producing a magnetic flux, said subassembly comprising a housing jacket 3.1, a winding support 3.2, a coil winding 3.3 and a cover dish 3.4, and further comprises a valve cartridge 2 comprising a capsule 2.1, a valve insert 8, a first end of which is inserted into the capsule 2.1, a magnet armature 4 having a valve element 6 (also referred to as a plunger), and a return spring 7. In the production of the solenoid valve 1, the capsule 2.1 and the valve insert 8 of the valve cartridge 2 are joined by being pressed onto one another, and the valve cartridge 2 is sealed off hydraulically with respect to the atmosphere by means of a sealing weld 2.2. In addition, the valve insert 8 absorbs the pressure forces arising in the hydraulic system and transmits said forces via a swaged flange 11 to a swaged region 12 of a fluid block 13.

When the coil winding 3.3 is energized via electric terminals 3.5, the magnet subassembly 3 produces a magnetic force, which moves the longitudinally movable magnet armature 4 with the valve element 6, which comprises a closing element 6.1 having a main sealing element 6.2, toward the valve insert 8 counter to the force of the return spring 7, wherein the valve element 6 and the return spring 7 are guided in an internal hole in the valve insert 2. The valve insert 8 transmits the magnetic flux, introduced by the magnet subassembly 3 via the cover disk 3.4, axially via an air gap 5 in the direction of the magnet armature 4. At a second end, the valve insert 8 furthermore receives the "valve body" 9, which comprises a main valve seat 9.1, into which the main sealing element 6.2, which is embodied as a rounded sealing tip, enters in a sealing manner in order to implement the sealing function of the solenoid valve 1.

As can furthermore be seen from FIG. 1, a valve bottom part 10 is placed against and supported axially on the valve insert 6, said bottom part comprising a check valve 10.1 arranged eccentrically with respect to the valve main axis. The valve bottom part 10, which is embodied as a plastic insert for example, is additionally used for sealing with respect to the surrounding fluid block 13, for sealing with respect to the valve body 9 and to accommodate a flat filter 10.2.

The prior art furthermore includes Patent Application DE 10 2004 030 428 A1. This document relates to an electromagnetic valve device. At least one part of the valve element is arranged in a valve chamber delimited in the region of the valve seat by the valve insert. Moreover, an end of the valve element remote from the valve chamber is operatively connected to an armature. In this case, an end of the armature facing the valve insert and/or an end of the valve insert facing the ends of the armature is embodied with a surface profile such that a flow cross section delimited by the ends varies, at least in some region or regions, in the radial direction and/or in the circumferential direction of the armature.

In general, the components comprising the valve element (plunger) and the armature are installed without guidance (i.e. with all degrees of freedom) in the valve. Moreover, the components are mounted loosely with respect to one another and can thus have many different orientations. In part, the valve element has somewhat more guidance here, by virtue of the clearance set, than the armature. The armature is often a cold formed steel component. In contrast, the valve element is an injection molded part manufactured from fiber reinforced plastic. Production often involves a lateral gating point. During the production of the valve element, distortion occurs in the component, owing to asymmetries in fiber orientation. This has the effect that the bearing surface at the rear end of the valve element (the end facing the armature) has a certain slope. The resulting component inaccuracy (especially on the armature and the valve element) has a very great effect on pressure setting accuracy.

Figure 2:
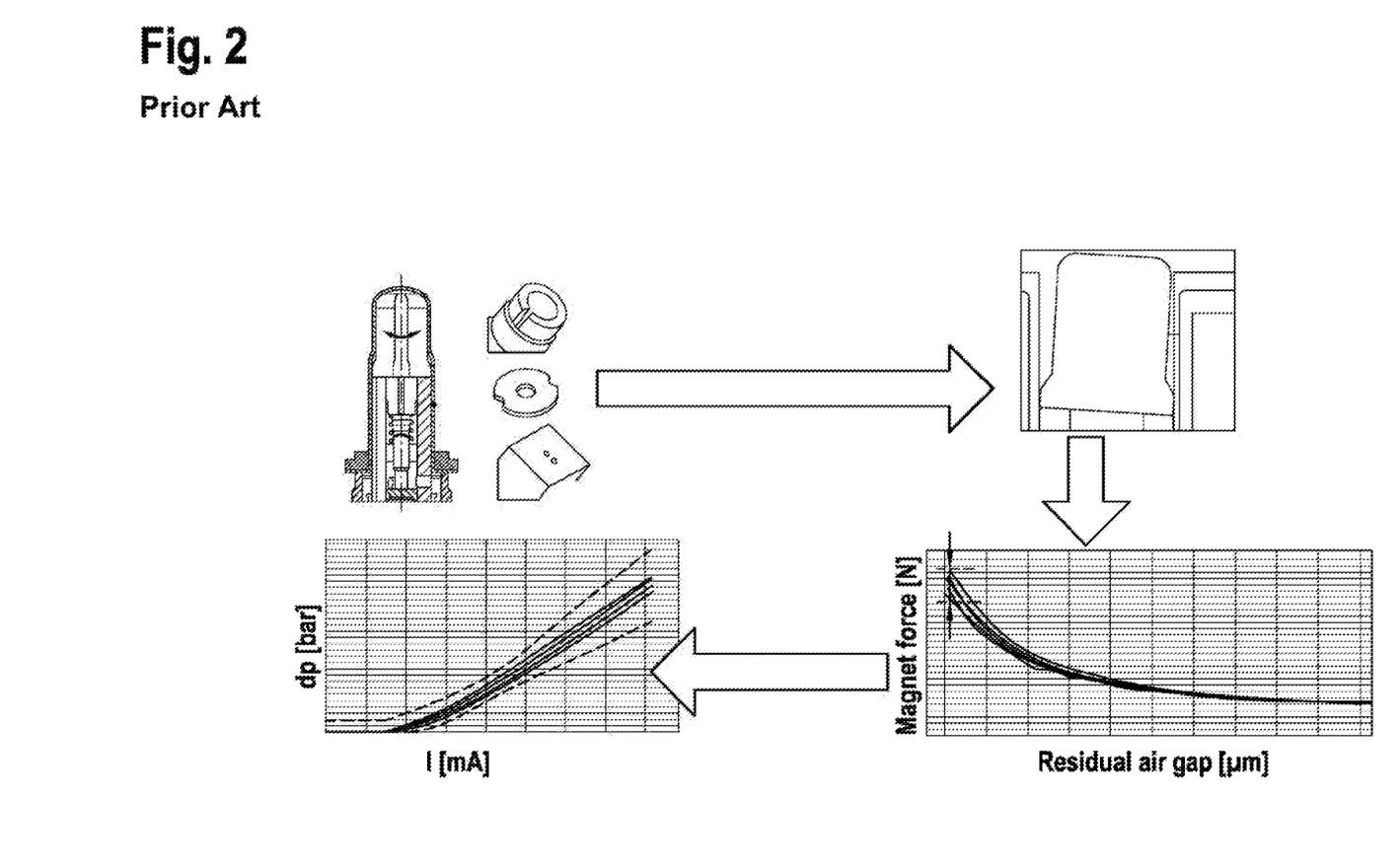
FIG. 2 shows a schematic cause and effect chain in respect of the pressure setting accuracy and armature tilt angle.

Moreover, different component orientations between the armature and the plunger can arise and, as a result, there can be fluctuations in the setting of the pressure (as illustrated in FIG. 2) because a large number of different relative positions between the armature and the plunger can be adopted, thus resulting in different magnetic forces. For example, reorientation (rotation) of the components leads to a change in the contact points.

SUMMARY

In contrast, the solenoid valve according to the disclosure advantageously allows an improvement in the pressure setting accuracy of the inlet valve and makes it possible to avoid magnetic forces that change in an undefined manner. This is made possible by the features of the disclosure.

Developments of the disclosure are indicated in the claims, description, and drawings.

The solenoid valve according to the disclosure for controlling the brake pressure of a wheel brake of a slip-controllable hydraulic brake system of a motor vehicle, having a valve element, which is arranged at least partly in a valve insert in a longitudinally movable manner and interacts with a valve seat and which, in the installed position, is acted upon by a spring device with a force component acting in the opening direction with respect to the valve seat and can be actuated in the closing direction with respect to the valve seat by means of an electromagnetic actuator, wherein the valve element is arranged between an armature and the valve seat, and a contact surface, at which the valve element is operatively connected to the armature, is formed on the valve element, characterized in that the contact surface is designed in such a way that a non-right-angled intersection angle is formed between a central axis of the valve element and the contact surface.

The central axis of the valve element is taken to mean a virtual axis which passes through the geometrical center of the cross section of the valve element. Here, the central axis is parallel with the circumferential surface of the valve element. The central axis extends from the main sealing element to the end facing the armature. In doing so, it may follow any curvature of the valve element. The contact surface is furthermore taken to mean a virtual surface which delimits the valve element and, in doing so, forms a contact surface with respect to the armature when the two components are in contact with each other in the installed position. It is defined by means of individual bearing points or, alternatively, bearing surfaces. The contact surface can also consist of a plurality of contact points or a plurality of partial contact surfaces. The contact surface is generally flat, i.e. two dimensional. The contact surface should therefore be taken to mean an inclined virtual plane at the end of the valve element which faces the armature, wherein there are thereon contact points which define a bearing situation between the valve element and the armature. The intersection angle is taken to mean the smallest angle which the central axis forms with the contact surface. According to the disclosure, it is now envisaged that the resulting contact surface of the valve element is at an angle differing from a right angle (that is to say 90°) to the central axis of the valve element at the level of the end face.

In particular, the valve element is injection molded and fiber reinforced. As already explained above, this results in distortion of the valve element. During the guidance of the valve element in the valve insert, this would result in the formation of an oblique end face of the valve element in relation to the direction of movement of the valve element. Owing to the loose guidance, the armature would align itself in accordance with this oblique end face of the valve element. This would lead to tilting of the armature during a movement. This results in a variation in the magnetic force and hence a variation in the pressure setting accuracy. Compensating the production-related distortion of the component thus allows an improved pressure setting accuracy.

It should be noted here that there is no direct compensation of the distortion of the component but that the effects of the distortion of the valve element (plunger) on the supporting surface for the armature are compensated by a corresponding modified configuration of the end face or contact surface, which forms the supporting surface for the armature. Basically, an inclined end face is created in relation to the plunger. This "inclined" plane compensates the distortions (especially of the plunger tip) during injection and thus produces a plunger which is as straight as possible (in relation to the functionally relevant tip).

For this purpose, the distortion to be expected is determined, e.g. by means of simulation or measurement. Following this, the design of the valve element is adapted to allow for the distortion to be expected. In this process, an inclined contact surface is created on the rear end of the valve element, for example, in order to form a non-right-angled relationship between the central axis and the contact surface. The inclined contact surface can be generated by means of defined contact points of different heights. In this context, an inclined end face or projections on the end face can be provided, for example. The adaptation and formation of the contact surface is therefore performed through the design of the endpoints of the end face.

Furthermore, it is advantageous if there is a clear definition of the contact points of the contact surface. As a result different contact situations between the valve element and the armature are avoided. This reduces the scatter in the magnetic force. It furthermore reduces the variation in the tilting of the armature.

In an advantageous embodiment, the solenoid valve is characterized in that at least one projection, in particular a plurality of projections, is formed on the end of the valve element, said projection or projections defining the contact surface.

This is taken to mean that the end has a raised portion (e.g. a step-shaped raised portion), by means of which the inclined contact surface discussed (inclined in relation to the valve element) is formed. As an alternative, a plurality of projections is provided, i.e. at least two or, for example, three or four or five contact points. The projections are also referred to as pads (or contact pads). The projections define the contact points with respect to the armature. The remaining area of the end face is not in contact with the armature, even when they rest against each other. As an alternative, the end face of the valve element can also have some other profile which defines and forms the inclined contact surface. It is also possible for an oblique end face itself to be understood as a projection by virtue of the raised surface on one side.

The simple implementation involved in the formation of the contact surface, which is not at right angles relative to the central axis of the valve element, is advantageous here. The positioning of projections on the end is associated with a low manufacturing outlay. For example, adaptation of the tool (e.g. by means of a notch) can be performed in order to form the projections in the injection molding process. With a plurality of projections there is furthermore uniform distribution of the force introduced.

In one possible embodiment, the solenoid valve is characterized in that a plurality of projections is formed, wherein said projections:
  are positioned radially at the same distance from the central axis of the valve element; and/or
  are positioned on the end of the valve element in a manner spaced apart circumferentially; and/or
  are positioned on the end of the valve element in a manner distributed symmetrically with respect to the central axis; and/or
  are positioned on the outer rim of the end of the valve element.

This advantageously results, in particular, in a reduction or even the avoidance of tilting of the armature. This can furthermore make possible a clearly defined contact situation between the valve element and the armature. Moreover, these embodiments lead to a uniform flow of force between the components.

In a preferred embodiment, the solenoid valve is characterized in that the contact surface has a defined angle relative to the central axis of the valve element.

This is taken to mean that the bearing surface formed by the end of the valve element is at a defined non-right angle to the armature. Any deviation is advantageously of the order of 1°. For example, a deviation of 0.33° was identified as advantageous. That is to say that the angle between the central axis and the contact surface at the minimum point is 89.67°. As an alternative, there can be deviations of a few degrees, e.g. 5 to 25°. An accurate setting of the contact surface can advantageously be accomplished by providing a defined non-orthogonal angle. This allows more precise guidance of the armature. This, in turn, reduces tilting of the armature during axial movement by creating a supporting surface which is perpendicular to the direction of movement of the armature.

In an alternative development, the solenoid valve is characterized in that the angle is defined in such a way that the contact surface allows a movement of the armature in the axial direction without tilting of the armature.

An improvement in pressure setting accuracy is thereby advantageously accomplished and this allows uniform magnetic forces by virtue of the relatively constant relative position (and contact situation) between the armature and the valve element.

In an advantageous embodiment, the solenoid valve is characterized in that the angle is defined in such a way that a distortion of the valve element caused by a production process is compensated by the angle.

The production process is taken to mean, in particular, injection molding with fiber reinforced plastic. As regards the term "compensation", attention is drawn to the above remarks. A suitable supporting surface for the armature is thereby advantageously created in order to prevent tilting thereof. For this purpose, use is made of the reproducible effect of distortion as a function of fiber orientation in the case, for example, of fiber reinforced plastic injection moldings with lateral injection. Compensation of the components produced is thus made possible.

In one possible embodiment, the solenoid valve is characterized in that the angle is defined in such a way that, in the installed position of the valve element, the contact surface is orthogonal with respect to a direction of movement of the valve element and/or is orthogonal with respect to a central axis of the solenoid valve.

The installation position of the valve element is taken to mean the valve element being installed in the solenoid valve. In this context, the direction of movement of the valve element is in the direction of the central axis of the solenoid valve. The direction of movement of the armature is likewise in the direction of the central axis of the solenoid valve, and therefore the definition of the angle of the contact surface can also be given as a function of the desired direction of movement of the armature. Suitable guidance of the armature is thereby advantageously made possible. This makes it possible to avoid the tilting of the armature during axial movement.

In a preferred development, the solenoid valve is characterized in that the height of the projection is dimensioned in such a way that the defined angle is set thereby.

Thereby is taken to mean that the slope of the regular end face of the valve element resulting from the distortion, for example, is corrected in the installed state by means of the projection. For this purpose, the projection (or the projections) is (are) defined in an appropriate manner, with the height thereof, in particular, being configured accordingly. As already explained, such a definition is made while taking into account the obliquities to be expected, e.g. on the basis of measured values, simulation or empirical values. Inaccuracies in surfaces can furthermore be taken into account in the definition of the height of the projections. The projections thus make it possible to produce and ensure a clearance such that contact between the valve element and the armature occurs at the defined contact points and not at undefined irregularities. It is thereby advantageously possible to ensure a clearly defined bearing situation, both in the case of normal irregularities and in the case of unusual circumstances, e.g. workpieces with a conditional error measure.

In an alternative embodiment, the solenoid valve is characterized in that at least two projections of the same height are formed on the end of the valve element.

This is taken to mean that there are two projections of the same height. For example, it is possible, even in the case of four projections, for 2 higher projections of equal height and 2 lower projections of equal height to be formed. The creation of defined contact points is thereby advantageously made possible. There is furthermore a reduction in the variation of component orientations.

In an advantageous embodiment, the solenoid valve is characterized in that at least two projections of different heights are formed on the end of the valve element.

This is taken to mean that at least two projections are provided for establishing the contact surface. In this case, the two projections have two different heights. It is thereby possible to define the contact surface. Even in the case of four projections, for example, it is possible to define and form 4 projections of different heights. The 4 pad heights (dependent position with respect to the gating point) can be defined in such a way, for example, that they form a bearing surface which is inclined by about 0.33° to the rear end face. This advantageously allows the creation of an inclined plane as a contact surface. In this case, the inclined contact surface is created by simple means during the normal casting process itself. The tool can be adapted for this purpose, for example. In this context, notches are suitable for producing the projections, for example.

In an advantageous embodiment, the solenoid valve is characterized in that three projections or four projections are formed on the end of the valve element.

This is taken to mean that precisely three projections are defined on the end of the valve element, for example. By selecting this number, it is possible to avoid overdetermination of the contact situation. "Wobbling" of the armature due to geometric overdetermination is thereby prevented. In an alternative embodiment, however four or 5 projections are also conceivable. In an alternative embodiment, the solenoid valve is characterized in that a respective projection is formed on each wing of the valve element. This is taken to mean that the valve element contains axial recesses which have a positive effect on the fluid flow, for example, while wings of the valve element which allow radial guidance remain between the recesses. Four wings can be provided, for example. A suitable distance between the contact points and the central axis can be set by positioning the contact points on the wings. It is thereby advantageously possible to optimize the bearing situation within the existing structure and geometry of the valve element. This makes possible the advantages described (in particular reduction/avoidance of tilting of the armature and a clearly defined contact situation) without changing the basic current design of the valve element.

In one possible embodiment, the solenoid valve is characterized in that the projections have flat surfaces, wherein, in particular, the flat surfaces form the contact surface, wherein, in particular, the contact surface has an angle relative to the central axis of the valve element.

This is taken to mean that the projections have surfaces which face in the direction of the armature. These surfaces serve as supporting and contact surfaces for the armature when the armature and the valve element are resting against each other. These surfaces of the projections take into account the described alignment of the contact surface and continue said contact surface. Large bearing points are thereby advantageously created in order to allow suitable force transmission. Point contacts are thereby avoided. A suitable surface pressure is thereby made possible.

In a preferred embodiment, the solenoid valve is characterized in that the end of the valve element has a profile, wherein, in particular, the raised portions of the profile define the contact surface.

This is taken to mean that the inclined contact surface described is produced on the end of the valve element which faces the armature by means of a profile which is formed. The armature is thus in contact with the raised portions of the profile. As regards the configuration of the profile, any desired shape is conceivable. For example, it can consist of depressions or hollows or bulges. The remaining rim region or a projecting bulge (arranged eccentrically, for example) could also serve as a projection. In designing the profile, optimization of the profile in respect of the manufacturing process, component durability, optimization of surface pressure or the like can furthermore be performed. Design in such a way that there is variation in the contact point during the armature stroke is likewise conceivable. The guidance of the armature could thereby be optimized.

According to the disclosure, a tool for producing a valve element for a solenoid valve for controlling the brake pressure of a wheel brake of a slip-controllable hydraulic brake system of a motor vehicle is furthermore provided, wherein the valve element can be arranged at least partly in a valve insert in a longitudinally movable manner and can interact with a valve seat and wherein, in the installed position, the valve element can be acted upon by a spring device with a force component acting in the opening direction with respect to the valve seat and can be actuated in the closing direction with respect to the valve seat by means of an electromagnetic actuator, and wherein the valve element can be arranged between an armature and the valve seat, and a contact surface, at which the valve element is operatively connected to the armature, is formed on the valve element, characterized in that the tool is configured to form the contact surface in such a way that a non-right-angled intersection angle is formed between a central axis of the valve element and the contact surface.

This is taken to mean a tool which is configured and designed to produce a valve element described as above. The non-right-angled intersection angle between the central axis and the contact surface refers, in particular, to the finished workpiece. The tool can be taken to mean an injection mold for the production of the valve element, for example. This injection mold can have recesses for the production of the projections on the end face of the valve element, for example.

In summary, it can be stated that: during the production of the plunger, distortions occur in the component owing to asymmetries in fiber orientation. This has the effect that the bearing surface at the rear end of the plunger also has a certain slope. Since this distortion is always associated with the fiber orientation, it is possible to compensate the effect in the tool. Through suitable configuration of the tool (different heights of the 4 contact pads, for example), it is ensured that the inclination of the bearing surface (which is formed by the 4 pads) is minimized after the cooling of the component.

BRIEF DESCRIPTION OF THE DRAWINGS

It should be noted that the features presented individually in the description can be combined in any technically feasible manner, giving rise to further embodiments of the disclosure. Further features and the advantageous nature of the disclosure will become apparent from the description of the illustrative embodiments with reference to the attached figures.

Of the figures.

DETAILED DESCRIPTION

FIG. 1 shows a schematic sectional view of a conventional solenoid valve. This has already been described as the prior art.

FIG. 2 furthermore shows a schematic cause and effect chain. In this case, possible inaccuracies in the individual components are shown in the illustrations at the top left. One of these inaccuracies is the material- and production-related distortion of the valve element. Such inaccuracies can lead to tilting or to oblique positioning of the armature relative to the valve insert, for example. This is shown in the illustration at the top right. During use of the valve, rotations of the armature and/or of the valve element can furthermore occur. These lead to variation in the oblique positioning of the armature relative to the valve insert, for example. However, variations in the oblique positioning of the armature lead to a varying magnetic force acting on the armature. This is shown in the illustration at the bottom right. The varying magnetic force acting on the armature leads, in turn, to differences in the current/pressure characteristic of the valve, as depicted at the bottom left in the illustration. Inaccuracies in the components thus cause different power characteristics in different valves—and indeed they produce differing characteristics in one and the same valve during use of the valve.

Figure 3A:
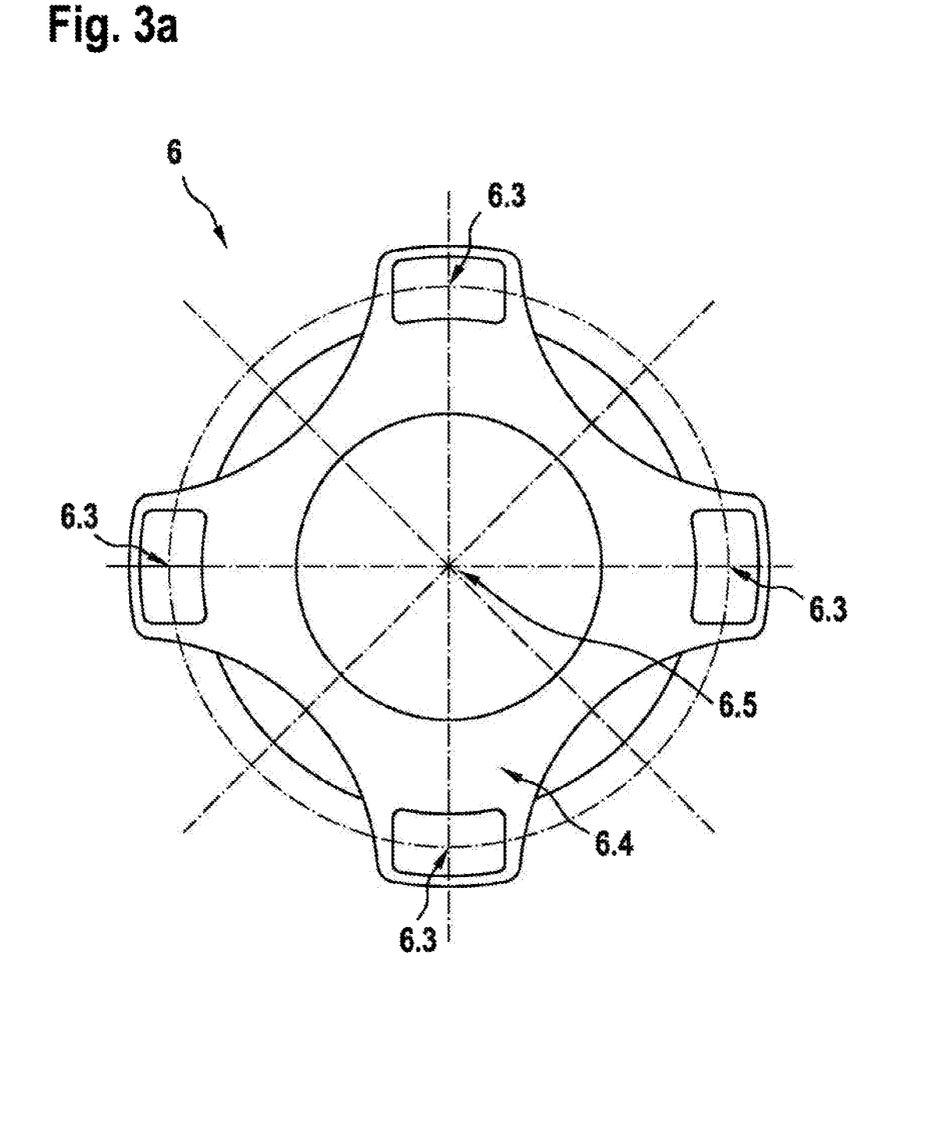
FIG. 3a shows a schematic plan view of an illustrative embodiment of a valve element having contact points that have been formed.
Figure 3B:
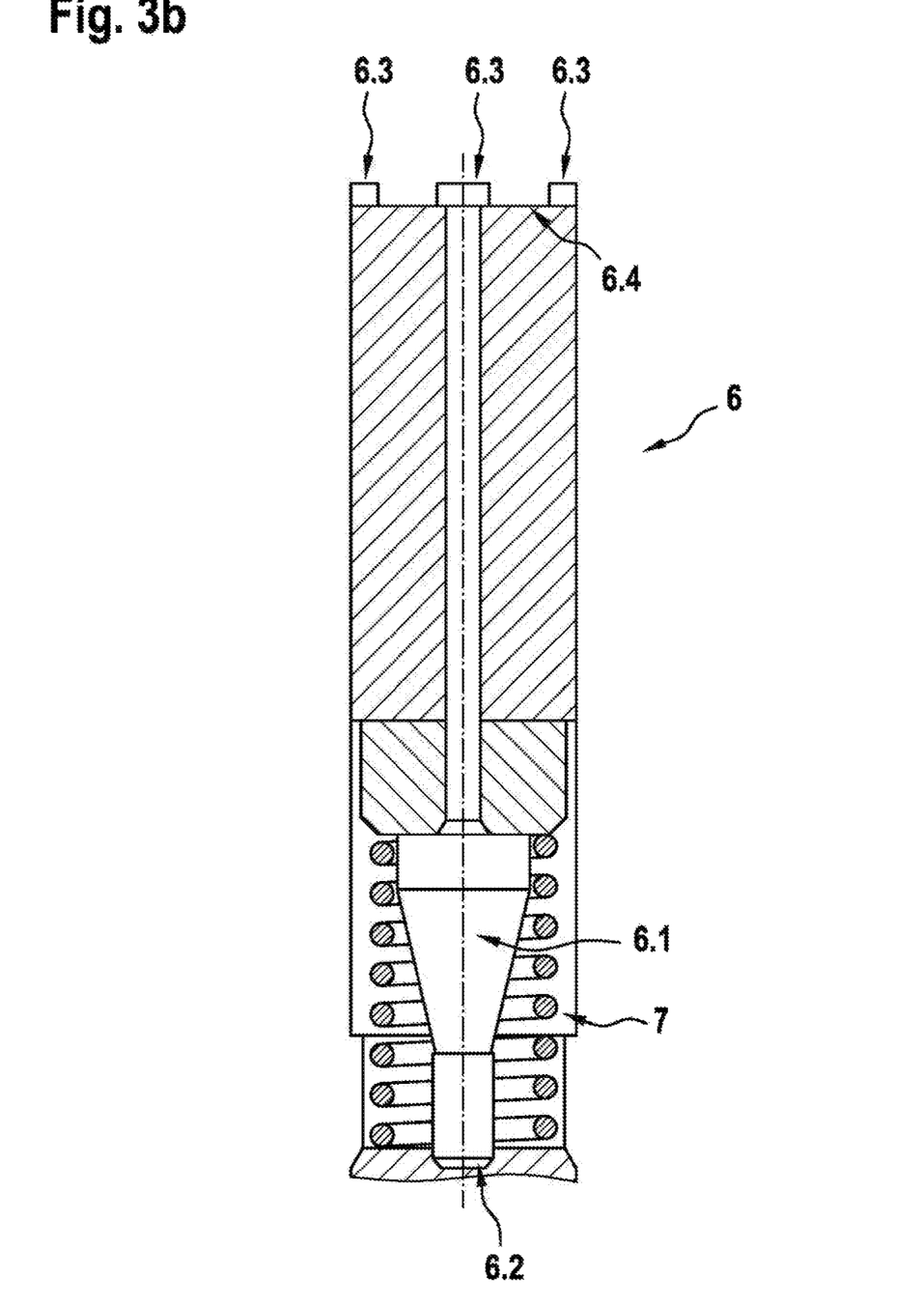
FIG. 3b shows a schematic side view of an illustrative embodiment of a valve element having contact points that have been formed.

FIG. 3a and FIG. 3b show embodiments of the disclosure. Here, FIG. 3a shows defined contact points 6.3 on the end of the valve element 6 in a direct plan view. The contact points 6.3 are defined and formed on the side 6.4 of the valve element 6 which faces the armature 4. Here, a respective contact point 6.3 is formed on each wing of the valve element 6. The contact points 6.3 are positioned at the outer rim of the end 6.4 but are slightly offset from the outer edge. The contact points 6.3 are longer in the circumferential direction than in the radial direction. The radial edges of the contact points 6.3 are aligned with the central axis 6.5 of the valve element 6.

FIG. 3b shows the illustrative embodiment in a side view. The valve element 6 is likewise illustrated here. It can clearly be seen here that the contact points 6.3 formed are on the end 6.4 of the valve element 6 which faces the armature 4 and have different heights. The spacing of the contact points 6.3 is furthermore also illustrated. The illustrated heights of the contact points 6.3 serve for improved identification. The closing element 6.1, the main sealing element 6.2 and the spring device 7 are furthermore illustrated.

Figure 4A:
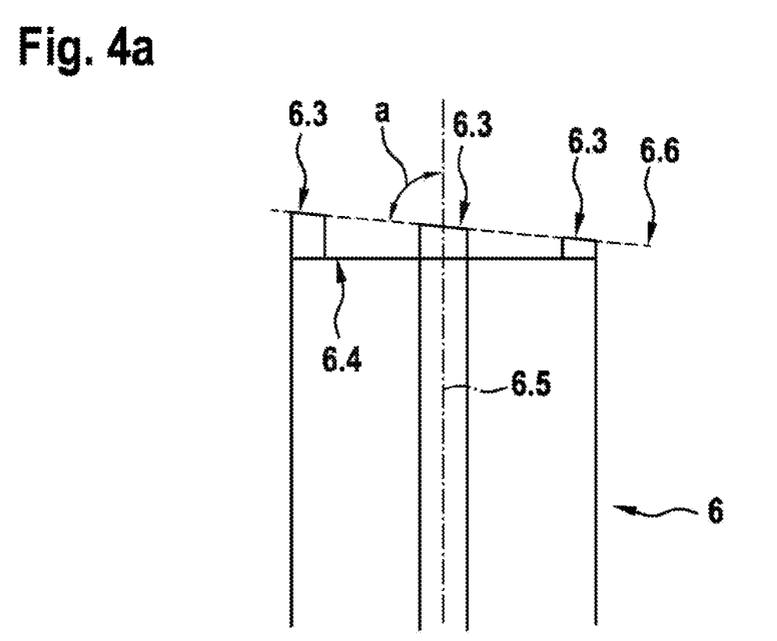
FIGS. 4a, 4b and 4c each show a schematic view of partial segment of an illustrative embodiment of a valve element.
Figure 4B:
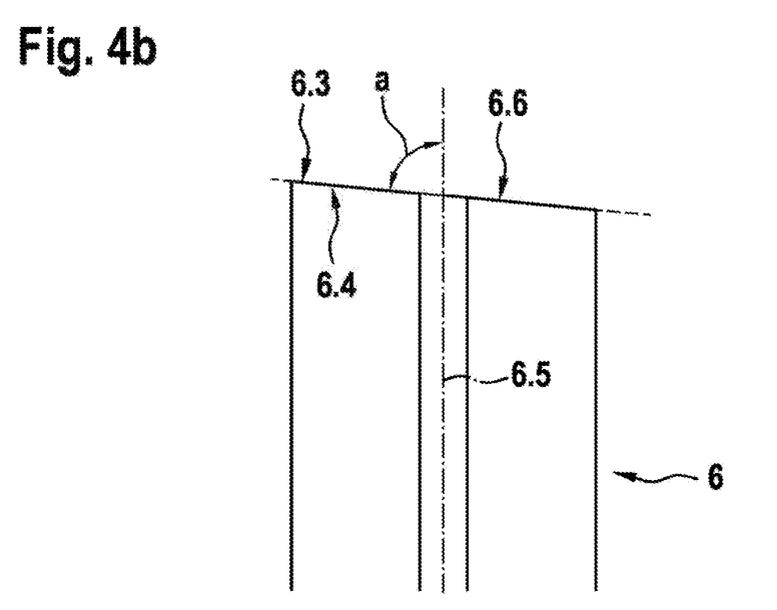
Figure 4C:
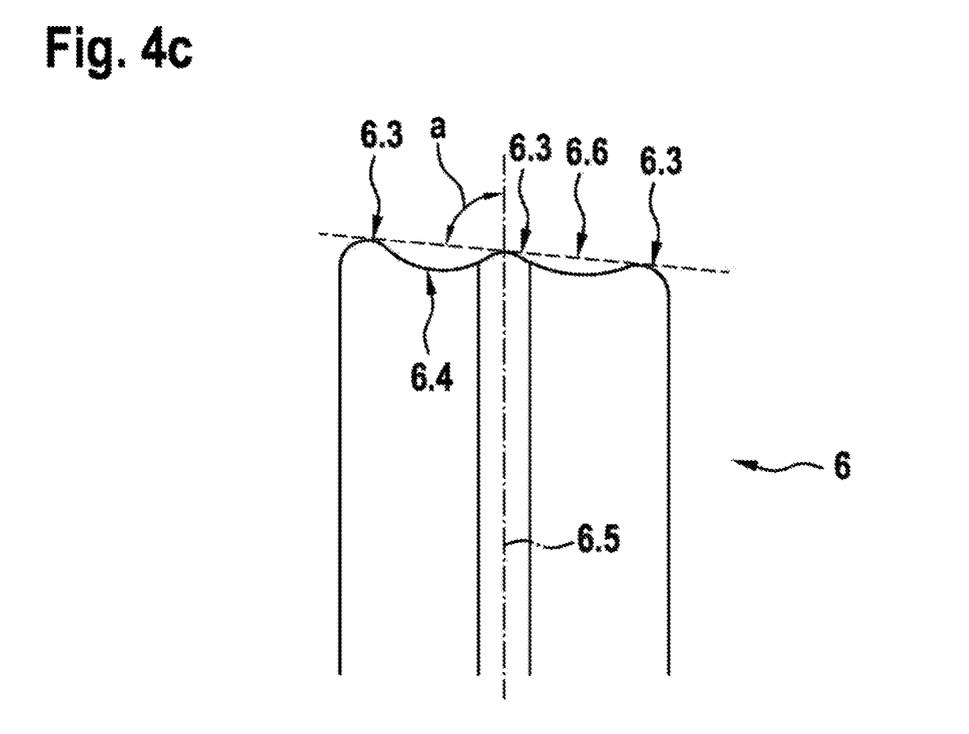

FIGS. 4a, 4b and FIG. 4c show embodiments of the disclosure in which only the upper region of the valve element 6 is illustrated. Here, the central axis 6.5 of the valve element 6 and the contact surface 6.6 are furthermore depicted. The angle a is defined between the contact surface 6.6 and the central axis 6.5 of the valve element. FIG. 4a shows an illustrative embodiment in which four projections 6.3 define and form the contact surface 6.6 (although only three projections can be seen in the figure). FIG. 4b depicts a projection 6.3 which is formed by the inclined end 6.4 of the valve element. In FIG. 4c, the end face 6.4 has a profile. This profile has a plurality of projections 6.3, which serve as bearing points for the armature and hence form the contact surface 6.6.

The invention claimed is:

1. A solenoid valve for controlling a brake pressure of a wheel brake of a slip-controllable hydraulic brake system of a motor vehicle, the solenoid valve comprising:
   a valve insert;
   a valve seat;
   an armature;
   a valve element positioned between the armature and the valve seat, and positioned at least partly in the valve insert in a longitudinally movable manner so as to be configured to interact with the valve seat, wherein:
      the valve element includes a contact surface that operatively connects that valve element to the armature; and
      the contact surface is configured such that a central axis of the valve element and the contact surface form a non-right-angled intersection;
   a spring device with a force component that acts on the valve element, in an installed position of the valve element, in an opening direction with respect to the valve seat; and
   an electromagnetic actuator configured to actuate the valve element in a closing direction with respect to the valve seat.

2. The solenoid valve as claimed in claim 1, wherein:
   the valve element further includes at least one projection formed on an end of the valve element; and
   the at least one projection defines the contact surface.

3. The solenoid valve as claimed in claim 2, wherein the non-right-angled intersection has a predetermined intersection angle.

4. The solenoid valve as claimed in claim 3, wherein the intersection angle has a magnitude such that the contact surface enables a movement of the armature in an axial direction without tilting of the armature.

5. The solenoid valve as claimed in claim 3, wherein the intersection angle has a magnitude such that distortions on the end of the valve element caused during production of the end are compensated for by the intersection angle.

6. The solenoid valve as claimed in claim 3, wherein the at least one projection has a flat surface that forms the contact surface.

7. The solenoid valve as claimed in claim 3, wherein a magnitude of the intersection angle is defined by at least one respective height of the at least one projection.

8. The solenoid valve as claimed in claim 2, wherein at least two projections of a same height are formed on the end of the valve element.

9. The solenoid valve as claimed in claim 2, wherein at least two projections of different heights are formed on the end of the valve element.

10. The solenoid valve as claimed in claim 2, wherein three projections or four projections are formed on the end of the valve element.

11. The solenoid valve as claimed in claim 1, wherein the valve element further includes an end with a profile having raised portions that define the contact surface.

* * * * *